Figure 1:
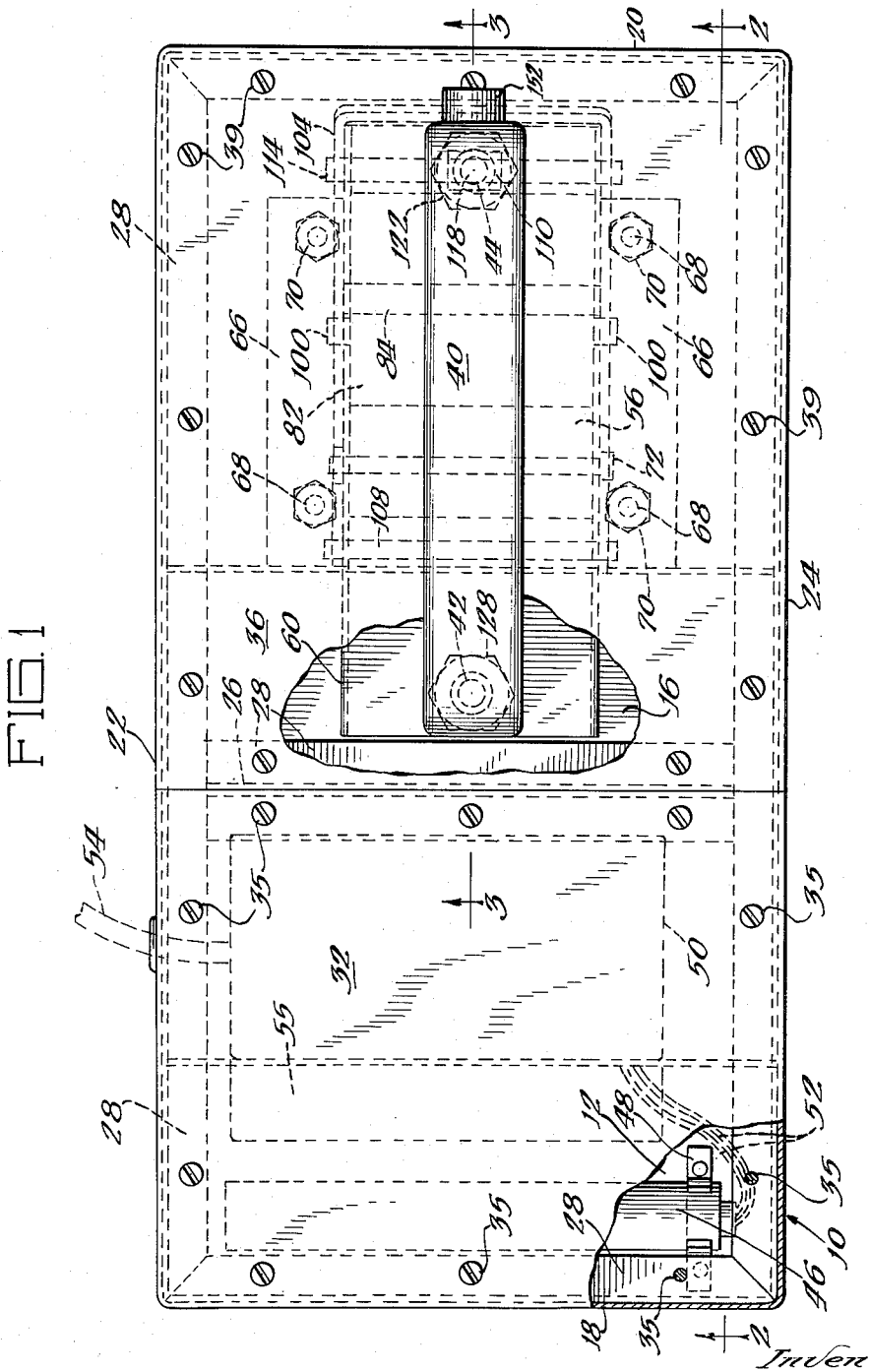

Aug. 29, 1961   P. SHEVICK ET AL   2,998,527
GAUGING DEVICE EMPLOYING RADIOACTIVITY
Filed June 10, 1958   3 Sheets-Sheet 1

Inventors
Philip Shevick
Raymond L. Meeder
Stanley Pappa
By Graf, Herman & Burmeister
Attorneys

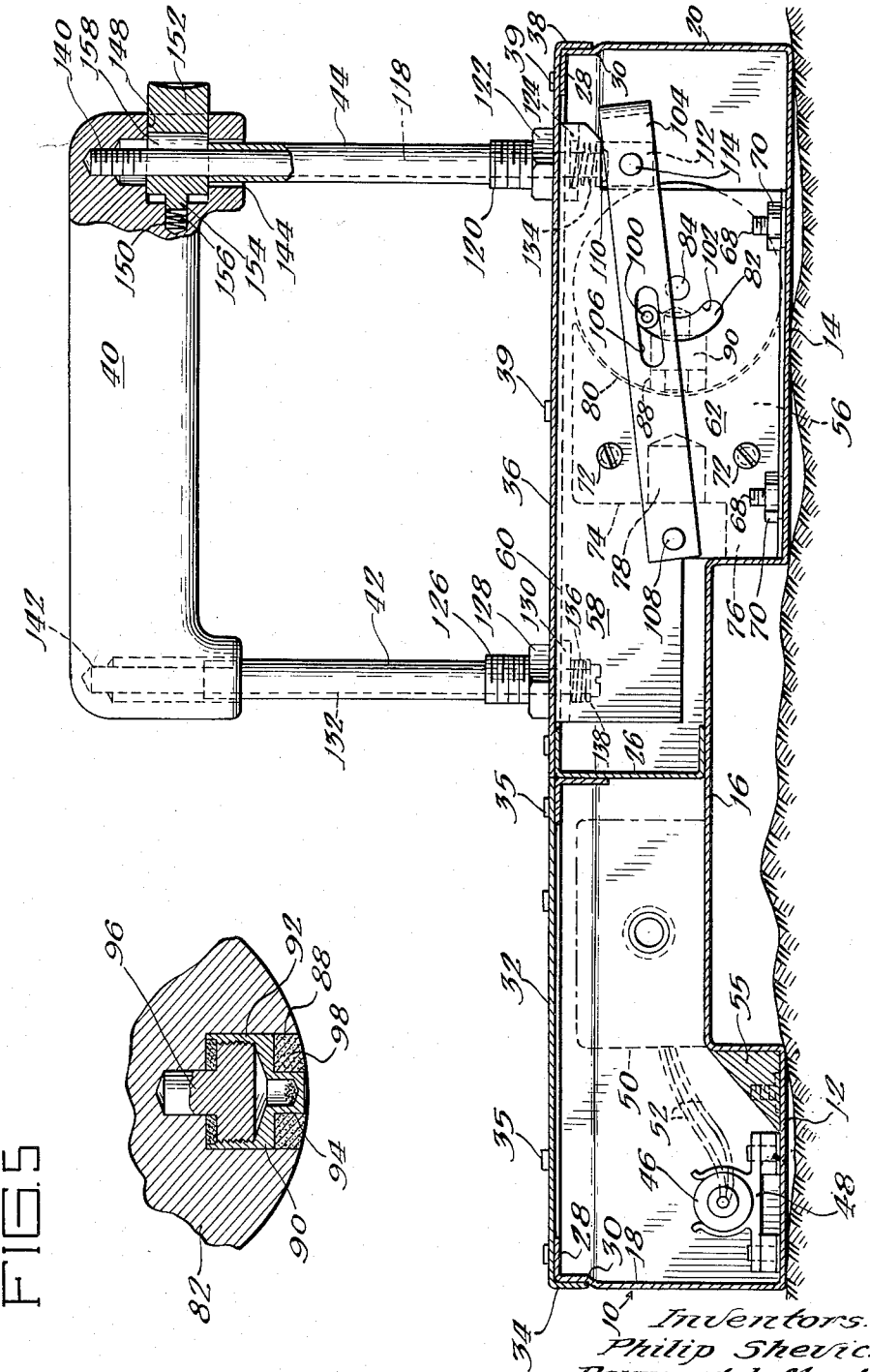

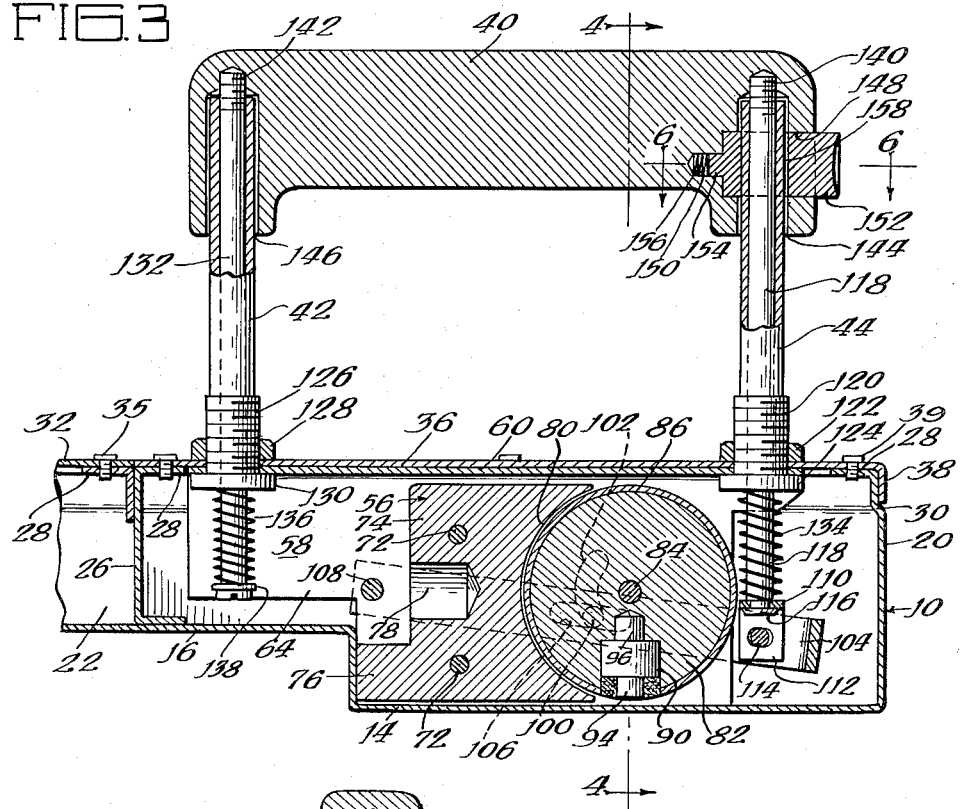
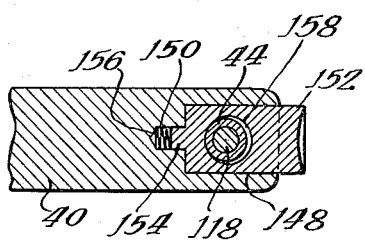
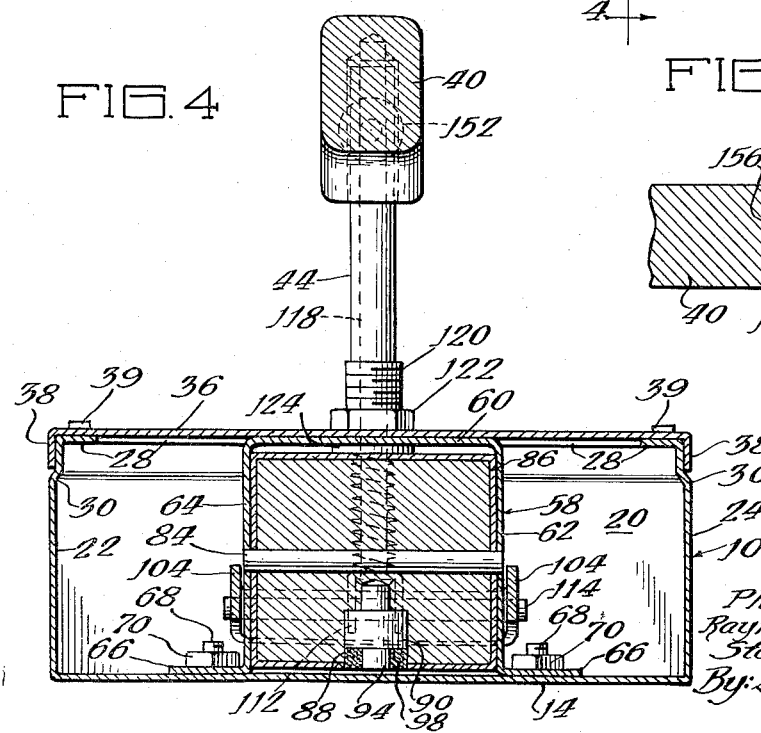

United States Patent Office 2,998,527
Patented Aug. 29, 1961

2,998,527
GAUGING DEVICE EMPLOYING RADIOACTIVITY
Philip Shevick, Chicago, Raymond L. Meeder, Palos Heights, and Stanley Rappa, Chicago, Ill., assignors to Nuclear-Chicago Corporation, Chicago, Ill., a corporation of Delaware
Filed June 10, 1958, Ser. No. 741,046
19 Claims. (Cl. 250—106)

This invention generally relates to improvements in devices employing radioactive sources, and more specifically to devices of this general character employed for the measurement of characteristics of materials, particularly materials such as soil.

It is the principal or direct object of the invention to provide an improved form of radioactivity "probe" or sensing instrument for the measurement of characteristics, particularly density, of materials upon the surface of which the device is placed. Broadly speaking, instruments of this general type are not novel. Various researchers, particularly in the soil sciences, have heretofore designed such instruments, the results of their work being described both in published literature and in the patent art. Briefly, the measurement of such characteristics as density by means of radioactivity relies on the fact that when a radioactive source and a detector are placed adjacent to a medium whose characteristics are under measurement, the response of the detector will vary with the characteristic under measurement, if parameters such as the nature and energy of the radiation from the source, nature and energy of the radiation to which the detector is sensitive, spacing, etc., are appropriately chosen. Where the source and the detector are incorporated in a single housing and there is substantial direct sensitivity of the detector to the type of radiations emitted by the source, a shield absorbing the direct radiations is placed between the source and the detector. The theory of such measurements is further set forth in connection with a description of a particular embodiment of the invention.

The invention claimed in the present application is not primarily concerned with the selection of appropriate parameters for maximizing the sensitivity and accuracy of the general method. It is, however, directed to a particular construction of a unitary portable probe for surface measurements, particularly measurements of density of soil, the probe being designed to be attached by a cable or similar transmission means to a suitable electronic system for measuring and indicating the response of the detector portion of the probe. The surface-type probes heretofore devised, while satisfactory in many cases for research purposes, are not suitable for widespread field use in such industrial utilizations as studies of sub-soil densities prior to highway, railway, building and dam construction, airfield pavement construction, and similar field measurements which are desirably made by personnel having no training or background in the handling of radioactive materials. It is thus the object of the present invention to provide such a device in which possible hazards to personnel owing to the presence of radioactivity are minimized, thus making practical the use of the device in field measurements by persons having little or no training in the handling of radioactive materials.

Although the primary object of the present invention is as set forth above, it is found that the invention, as hereinafter to be described, contains features which may be incorporated in devices employing radioactivity for somewhat different purposes. For example, the construction of the radioactive source assembly employed in the surface-type density probe to be described will also find utility in other radioactivity devices, both measuring instruments and otherwise.

For a more complete understanding of the details of the aims and objects of the invention generally described above, and for understanding of the structure by which such aims and objects are accomplished, reference is made to the embodiment of the invention illustrated in the attached drawing, in which:

FIGURE 1 is a top plan view of a density probe embodying the invention;
FIGURE 2 is a view in longitudinal section taken along the line 2—2 of FIGURE 1;
FIGURE 3 is a partial view in longitudinal section taken along the line 3—3 of FIGURE 1, with the parts in a different operating position than in FIGURE 2;
FIGURE 4 is a transverse sectional view taken along the line 4—4 of FIGURE 3;
FIGURE 5 is an enlarged detailed view corresponding to a portion of the view of FIGURE 3; and
FIGURE 6 is a detailed sectional view taken along the line 6—6 of FIGURE 3.

General construction

As seen in the drawing, the assembly is incorporated in a generally rectangular housing or case 10 having flat bottom portions 12 and 14 at the opposite ends thereof and an upwardly recessed central bottom portion 16, end walls 18 and 20 and side walls 22 and 24. A partition 26, on the upper side of the central bottom portion 16, divides the housing into two segments. These segments are, by appropriate inward bending of the sheet metal members (preferably of stainless steel) from which the housing 10 is formed, provided with inwardly extending flanges 28 at their tops. The end walls 18 and 20 and the side walls 22 and 24 are all formed with shoulders 30 near the top. A cover plate 32, provided on three sides with depending flanges 34, is secured by screws 35 to the top of one segment of the housing, and a cover plate 36, having on three sides depending flanges 38, is secured by screws 39 to the other segment of the housing. A carrying handle 40 bridges the upper ends of tubular uprights 42 and 44.

The general housing construction and appearance from the exterior being thus described, the general content and structure of the detector assembly in one segment of the housing will now be described, this description being followed by a description of the radioactivity source assembly in the other segment of the housing.

The detector assembly

The detector 46 is a cylindrical Geiger tube mounted on support clips 48 at one end of the housing (hereinafter considered, for purposes of convenience of description, the front or forward end). In the rearward portion of the detector compartment, adjacent to the partition 26, is a preamplifier, shown in highly schematic dotted block outline form at 50. It will be understood that the dotting of the outline 50 is of no mechanical significance, this portion of the drawing merely indicating that electronic components, constituting in themselves no part of the present invention, are mounted in this portion of the housing, the physical representation of the transistors, resistors, condensers, etc., employed in the preamplifier being of no significance as regards the invention presently described, and therefore being omitted. In practice, the preamplifier employed is a transistorized feedback amplifier of high stability. It will also be understood that the leads shown in the drawing as entering the preamplifier 50 from the detector 46 are likewise schematic, rather than pictorial. As seen in FIGURE 1, a cable 54 connects the detector and associated preamplifier to a suitable voltage source and to a scaler and register (none of which are illustrated) for the purpose of producing an indication of the response of the detector and supplying the power for the operation of the detector and preamplifier.

A triangular wedge 55 of lead extends across the region of the compartment adjacent to the recessed portion 16.

*Source assembly structure*

In the rear compartment of the housing 10 is mounted the source assembly now to be described. Substantially central of the bottom of this compartment or segment of the housing is a shield block 56 secured in a source assembly housing 58, which has an inverted U-shaped cross section formed by a top web 60 and side plates 62 and 64. The housing 58 occupies most of the length of the compartment of the case 10 in which it is located. The lower front corners of the side plates 62 and 64 are cut away to accommodate the rear portion of the recessed central portion 16 of the case 10. The lower rear portion of the side plates 62 and 64 is also cut away, to permit the presence and operation of parts later to be described.

The side plates 62 and 64 have laterally extending ear portions 66, which are secured to the bottom of the case by studs 68, affixed to the bottom 14, and nuts 70. Bolts 72 pass through the side plates 62 and 64 and through the shield block 56, thus securing the latter in position between the side plates.

The front edge or face 74 of the shield block 56 has a forward extension or lip 76 on the lower portion thereof. The central portion of the front face 74 has a bore 78 extending part way through the block. The rear end surface of the shield block 56, designated 80, is concave substantially in the form of a half-cylinder, the radius of such half-cylinder being approximately equal to one-half the height of the block. Nested with a very slight clearance into the concave surface 80 is a cylinder 82 journaled on a shaft 84 extending between the side plates 62 and 64. The cylinder 82, which is of the same material as the shield block 56 (preferably lead), is encased both on its circumference and on its ends in a jacket 86, preferably of brass. In the central portion of the circumference of the cylinder 82 is a stepped bore 88, in which is seated a source holder 90, shown in detail in FIGURE 5.

The source holder 90 comprises a cup-shaped casing 92, internally threaded, having a central source receptacle extension 94 on the bottom thereof, and an externally threaded cap 96 in the internally threaded casing 92, the radioactive material employed being in the receptacle 94 and being substantially at the outer surface of the cylinder 82 (jacket 86 omitted in FIGURE 5). The region surrounding the receptacle 94 is packed with a suitable plastic 98, sealing the source holder 90 against the possibility of leakage of the radioactive material and also securing it in place in the cylinder.

A pin 100 is imbedded in the cylinder 82 parallel with the shaft 84, the ends thereof protruding through the jacket 86. The side plates 62 and 64 have slots 102 each describing an arc of 90 degrees and passing the pin 100 to permit rotation of the cylinder 82 between respective terminal positions wherein the source holder 90 is directed downward (FIGURE 3) and wherein the source holder is in the innermost position in the concave and 80 of the shield block 56 (FIGURE 2).

The ends of the pin 100 also pass through the arms of a U-shaped lever 104, which has longitudinal slots at 106, the lever being pivoted on the forward portion of the source assembly 58 at 108. A drive bar 110 is coupled by downwardly depending ears 112 to a pivot pin 114 extending between the side members of the lever 104.

The drive bar 110 is riveted at 116 to the lower end of a rod 118 which extends upward out of the compartment through the tubular upright 44.

The lower end of the upright 44 terminates in an externally threaded bushing 120, a nut 122 securing the bushing 120 and the upright 44 in place by clamping the upper web 60 of the source assembly housing 58 and the cover plate 36 between the nut 122 and a flange 124 at the lower end of the bushing 120, the web 60 and cover plate 36 being apertured to pass the bushing 120. A similar bushing 126, nut 128 and flange 130, serve to secure in place the upright 42. A rod 132, similar to the rod 118, extends through the upright 42.

A coiled spring 134, surrounding the lower end of the rod 118, is compressed between the lower surface of the flange 124 on the bushing 120 and the drive bar 110, thus urging the rod 118 and drive bar 110 downward. A similar coiled spring 136 is compressed between the lower surface of the flange 130 and a washer 138 secured to the bottom end of the rod 132. The upper ends of the rods 118 and 132 are threadedly engaged in the ends of the handle 40 at 140 and 142 respectively. The end portions of the handle 40 are bored at 144 and 146 to slidingly receive the uprights 44 and 42, within which the rods 118 and 132 respectively slide.

The rear end of the handle 40 is longitudinally bored at 148, the bore 148 terminating in a smaller central bore 150. In the bore 148 is a plunger 152 having formed on the end thereof a pin 154 fitting the small bore 150 in which is seated a coiled spring 156. A vertical diametrical bore 158 through the horizontally positioned plunger 152 slidingly passes the upright 44 (see FIGURE 6).

*Source assembly operation*

The structure of the illustrated device having been described, the manner of its mechanical operation, and its functional utility in the purpose it is designed to accomplish, may readily be understood.

Considering first the mechanical operation of the radiation source assembly, it will be seen that the device has two terminal conditions, corresponding to the two rotational positions of the cylinder 82 described above. The device is shown in FIGURE 2 in its carrying or non-operating position or condition, and in FIGURE 3 in its operating condition. In considering the entire cycle of the operation, it is of course possible to start at any point in the cycle, but it will be convenient to employ the condition of FIGURE 3 as the point of first reference. As will be seen in this figure, the handle 40 is in a lower position (compared to that of FIGURE 2), the rods 118 and 132 being driven down through the upright tubes 44 and 42, thus holding the drive bar 110 down and, by reason of the coupling to the lever 104, also holding the latter down in its lowermost rotational position about its pivot 108. In this condition, the engagement of the pin 100 in the slots 106 holds the cylinder 82 in the rotational condition wherein the source holder 90 is at the bottom of the casing, thus emitting the radiations of the source into the surface upon which the device is placed. It will be noted that the lower portion of the arc of the surface 80 of the shield block extends sufficiently less than a full 90 degrees to avoid blockage of the free passage of the radiations of the source into the adjoining surface. In this condition, as will hereinafter be more fully described in connection with the nuclear aspects of the operation of the device, the intensity of the radiation activating the detector at the opposite end of the device is an indication of the density of the soil, concrete, or other surface upon which the device has been placed.

The probe may be placed at any desired point with the handle in the condition illustrated in FIGURE 3 and left there until the measurement is completed. It will be noted that jarring or vibration will not disturb the position of the cylinder 82 because the springs 134 and 136 urge the cylinder to the operating position shown in FIGURE 3, thus preventing the possibility of drift of the source away from its desired position during operation, which would, of course, seriously impair the measurement. It is also to be noted that the springs 134 and 136 need not exert great force for this purpose, since the full cylindrical shape of the cylinder 82 forms a fairly balanced load, the lower half-cylinder being substantially balanced by the upper half-cylinder. It will of course be observed that the position illustrated in FIGURE 3 is not the "natural" position of the cylinder which it would assume if it were unrestricted, since the weight distribution due to the presence of the source holder and its sealant (both of which are of much less weight than the corresponding volume of the lead shielding) make the downward-facing position of FIGURE 3 an unstable position, if other forces were neglected. The unstable equilibrium which is thus created is easily maintained by abutment of the pin 100 against the lower end of the arcuate slot 102, on the one hand, and by the relatively modest force exerted by the spring 134, on the other.

In the position of FIGURE 3, the detector is shielded from direct radiations from the source by the full intervening thickness of the shield block, including the extended lower lip or extension 76, and also by the wedge 55. It will be seen that even neglecting the presence of the bore 78 (the purpose of which will be described hereinafter), the direct path between the source and the detector has a much greater thickness of shielding material in the operating position illustrated in FIGURE 3 than in the position of FIGURE 2. The lip 76 and the wedge 55, in addition to further extending this direct path, also serve to discriminate against radiation phenonema extremely close to the surface of the medium under measurement.

It will be noted that in the condition illustrated the source constitutes substantially no hazard to personnel. As is well known, large bodies of such materials as soil and concrete and other materials upon which such measurements are usually made in themselves constitute excellent shielding materials. Thus the only radiation which can escape when the device is in the operating position shown is radiation rearward (to the right in FIGURE 3) at a very low angle. Of course, if desired, additional shielding material may be employed to prevent even such radiation, but it is found in practice that such radiation constitutes no hazard with the sizes of source required for any usual type of measurement. For all but the smallest angles, substantially parallel with the ground, the radiation is virtually negligible because of the increased lead thickness encountered by the radiations from the source as the angle with the ground increases.

Consider now the operation of the device illustrated when a measurement is completed and the device is to be moved to another point for a similar measurement. When the device in the state shown in FIGURE 3 is picked up by the handle 40, in the first stages of lifting the handle the rods 118 and 132 are lifted against the force of springs 134 and 136. As previously indicated, these springs need not exert great force in order to hold the cylinder 82 in the operating position, and, accordingly, they are selected so that the weight of the entire device, including the shield block, the cylinder, and the housing, is sufficient so that the housing does not move until the rods 118 and 132 have moved out to their outermost position, where the springs 134 and 136 are completely compressed. This relative motion of the rods with respect to the rest of the source assembly actuates the lever 104, which in turn rotates the cylinder 82 to the position shown in FIGURE 2, wherein the source is completely encased in the shield consisting of the stationary and movable parts described above.

It will thus be seen that picking up the device by the handle 40 automatically encases the source in the shield, thus making it impossible to create a hazardous condition by picking up the device by means of its handle without shielding the radioactive material. It will be noted that as the handle is raised, with the rest of the device stationary, the aperture in the plunger 152 slides upward along the exterior of the support tube 44 until the lower surface of the plunger 152 passes the top of the support tube 44, at which point the plunger snaps outward (to the right in the position shown in FIGURES 2 and 3), thus latching the handle in the uppermost position, and by the same token latching the source in its encased position. It is thus unnecessary, in setting the device down for storage or similar purposes, to take any precautions of a special nature concerning the source, since it is necessary, to expose the source, to first unlatch the device by pressing the plunger. There is thus avoided the otherwise-existing possibility of creating a radiation hazard by placing the device on a surface not highly absorptive of radiations, such as a thin tabletop. It is also to be noted that mere accidental depressing of the plunger 152 will not expose the source unless downward pressure is applied on the handle 40, because of the fact that when the device is in the condition of FIGURE 2, by reason of the disparity between weights of the two halves of the cylinder due to the discrepancy between the weight of the source and of the corresponding volume of the shielding material, the force required to rotate the cylinder 82 back to the position of FIGURE 3 is considerably greater than that required to merely hold the device in the position of FIGURE 3, if the device is seated horizontally in both instances.

*Nuclear characteristics*

The mechanical operation and general configuration of the device having been described, the details of the design of the device from the nuclear standpoint may now be set forth.

The density gauge employs a gamma ray source and relies for its operation on Compton scattering in the medium under measurement. In the case of elements commonly found in soils, the magnitude of the Compton scattering will be a function of the density of the material. Thus, considering the scattering phenomenon itself, the higher the density, the higher the response of the detector. However, as the density is increased, the absorption of the scattered particles before they are able to reach the detector likewise increases. Thus for any given spacing of the detector from the source (which is shielded from the detector for direct radiations), the empirical curve obtained of detector response as a function of increasing density is extremely low at low values of density, rises as the increasing density is accompanied by corresponding scattering, and then again falls at extremely high values of density as the absorption of the scattered radiation begins to predominate over the effect of the increased scattering.

It will thus be seen that the spacing between the source and the detector must be chosen with considerable care in order to achieve the desired results. Obviously, in order to make the results of the measurements capable of ready interpretation, the detector response must be a monotonic function of density over the entire range of densities likely to be encountered in use of the instrument. In regions of the curve of detector response versus density remote from the peak response, the gradient of detector response is very small. Thus all of the parameters must be very carefully chosen in order to produce an operating region in which the detector output is a sensitive and unique function of the density of the material under measurement over the entire range of densities likely to be encountered. In the case of soil measurements, for which the present apparatus is designed, a fairly linear output indication can be obtained if the parameters are properly chosen. This results in large part from the fact that the chemical composition of most soils is remarkably uniform irrespective of soil types.

A detailed analysis of the phenomena involved in the operation of the device would require taking into consideration the scattered energy distribution over the total solid angle seen by the detector and the energy response of the detector. Such an analysis would in any case be difficult and complex, but in the case of a detector-source-sample geometry such as that presented by the present surface-type probe, theoretical analysis becomes prohibitive. However it can be shown, for both surface measurements such as those presently described and for measurements employing more favorable measuring geometries, that the calibration linearity is optimized by minimizing the exposure of the detector to rays scattered through large angles and also by minimizing the response of the detector below 10 or 20 kev., where the possibility of counting photoelectric interactions which occur at the air-medium interface is large.

Based on such considerations and on experiment, the source-to-detector distance employed in the present device is 9 inches. Employing $Cs^{137}$ as the gamma-ray source, a fairly linear calibration in the density range between 60 and 140 pounds per cubic foot is obtained. The slope of this curve is quite independent of detector response or of gamma energies as long as the latter are in the range from 80 kev. to 2 mev., thus permitting the choice of the radioactive material mentioned above on the basis of a desirable half-life, capability of being shielded with fairly small thicknesses of lead, and relatively low cost. A source of 2.5 to 3.5 millicuries is found to give fully adequate intensities. A metal-wall bismuth-coated Geiger counter is employed because of its high sensitivity.

Employing such components, the required shielding thickness for safety is substantially less than an inch of lead, thus permitting the use of a cylinder 82 of less than 2 inch diameter and a block 56 of less than 2 inch thickness.

It will be seen that the energy of the source affects the depth or thickness of the material under measurement which participates in the production of the detector response, and that this "sensitive thickness" is also affected by the density of the material itself. With the source used, as set forth above, the sensitive thickness varies from approximately 9 inches at 60 pounds per cubic foot to 3 inches at 140 pounds per cubic foot.

A factor in the measurement not previously mentioned is the influence of moisture. The probability of Compton interaction in hydrogen is substantially higher than in the materials commonly found in soils. Thus for accuracy of measurement of density, the moisture content must be measured or otherwise known, and a correction applied to the density measurement if required.

The presence of the wedge of shielding material at the Geiger tube prevents the occurrence of large errors in measurement which would otherwise be caused by small inhomogeneities at the surface of the material under measurement. The wedge shields the counter from extremely small-angle scattering, the lip or extension on the front end of the rear or main shield block also contributing to this minimizing of the effect of surface discontinuities. Over the range of soil densities described, most of the detector response resulting from interactions within the first ½ inch or so of soil is eliminated. By the use of the wedge, it is experimentally found that the error introduced by raising one end of the probe 3/16 of an inch from the ground is reduced to one-fourth the error thus introduced in the absence of the wedge. Of course, the substantial elimination of surface effects is necessarily accompanied by a reduction in detector response, since the contribution of the surface to the response is very great in the absence of such provisions. But it is found that by the use of a detector of high efficiency, such as a metal-wall bismuth-coated counter, adequate detector response for the measurement can be obtained without the necessity of providing a radiation source of such size as to require an excessively heavy shield in order to prevent hazard in operation and handling of the device.

The upward recessing of the central portion of the bottom of the housing eliminates errors which would be caused by protrusions on the surface under measurement in this region in the absence of such recessing. If a completely flat bottom were employed, one end of the device would not rest on the surface unless extreme care were taken in placement.

In the non-operating or storage condition (i.e., with the source encased in the shield), a reference calibration response may be obtained from the detector by reason of the beam of relatively low intensity which is permitted to fall on the detector from the source through the partial bore in the shield. This beam, although of insufficient intensity to constitute any substantial radiation hazard, is sufficient to give an adequate indication of proper operation and a reference detector response. Checking of calibration by the use of this low-intensity radiation is preferably done with the instrument held removed from a surface or placed on a suitable surface known to produce either a negligible or a fixed influence on the detector response. When the device is in use, because of the construction which has been previously described, the decreased thickness of shield which exists between the source and the detector in the calibrating position becomes the full thickness, so that the direct response of the detector to the source in the operating position becomes negligible.

It will be noted that the primary purpose of one half of the shielding cylinder in which the source is mounted is that of a counter-weight for the other half; however the additional and otherwise unused shielding it provides is taken advantage of by employing, as a matter of convenience, a deep bore in the half-cylinder of principal importance, thus permitting the use of a source-holder of substantial size.

From the description above, and from the illustration of the drawing, it will be obvious that the invention is not limited to the particular embodiment shown, which is merely selected for illustration in accordance with the requirements of the patent laws. Persons skilled in the art will, after study of the illustrated embodiment and of the description above, readily devise constructions which, although they are far different in appearance and in details of operation, nevertheless incorporate the basic features of inventive novelty over the prior art. Further, as regards some of such novel features, it will be found that the teachings of the invention may be applied to devices having an overall purpose or utility substantially different from the described purpose of the particular device shown in the drawing. Accordingly, the scope of the patent protection to be given the invention should not be limited by the particular embodiment shown, but should extend to all embodiments falling within the claims which are hereto appended for the purpose of defining the scope of the invention, together with reasonable equivalents of the various parts and portions recited.

What is claimed is:

1. A surface-type soil characteristic measurement device comprising a housing having opposed end portions, a radioactivity detector in one end portion, a radioactive source assembly in the other end portion comprising a shield, a radioactive source, mechanism coupling the source to the shield to selectively encase the source in the shield and expose the source at the bottom of the shield with the shield remaining in direct line between the source and the detector, a handle, means atop the housing supporting the handle for sliding vertical motion between innermost and outermost positions, means coupling the handle to said mechanism to encase the source in the shield in response to upward motion of the handle and to expose the source in response to downward motion of the handle and a manually releasable latch securing the handle in the uppermost position.

2. A surface-type soil characteristic measurement device comprising a housing having opposed end portions and an intermediate portion, a radioactivity detector in one end portion, a radioactive source assembly in the other end portion comprising a first shield member having the outer end thereof formed with a recess of substantially semi-circular cross section, a second shield member having a semi-circular surface of substantially corresponding radius, a radioactive source in the surface of the second shield member, rotatable mounting means supporting the second shield member in the recess, a handle, means atop the housing supporting the handle for sliding vertical motion between upper and lower positions, mechanism coupling the handle to the second shield member to rotate the second shield member into the recess in response to upward motion of the handle and to rotate the second shield member 90° downward in response to downward motion of the handle, and a manually releasable latch securing the handle in the upper position, the bottom of the intermediate portion of the housing being recessed with respect to the bottom of the end portions.

3. The device of claim 2 having a counterbalance for the weight of the semi-circular portion of the second shield member.

4. The device of claim 3 wherein the second shield member is circular, so that the semi-circular portion is counterbalanced by an opposite semi-circular portion.

5. A surface-type soil characteristic measurement device comprising a housing having opposed end portions and an intermediate portion, the end portions containing, respectively, a radioactivity source and a radioactivity detector, and the bottom of the intermediate portion being recessed with respect to the bottom of the end portions, at least one of said end portions containing shielding means in the direct line between the source and the detector, and both end portions containing shielding means blocking emission and detection, respectively, at small angles to the direct line.

6. A device for measuring radiation transmission characteristics of materials comprising a radioactivity detector, a radioactivity source, a first shield member between the source and the detector adjacent to the source, a second shield member between the source and the detector adjacent to the detector and substantially spaced from the first shield member, and a unitary housing securing all of said elements in said relative positions and adapted to position said elements against a body having the characteristics under measurement, whereby the effect on the measurement of surface irregularities on the body under measurement is minimized.

7. A radioactivity device comprising a radioactivity source and a radioactivity shield, an elongated operating member having a carrying handle on the end thereof, means for mounting the operating member for vertical sliding motion with respect to the shield, means responsive to lowering of the operating member to expose the source at the bottom of the shield, means responsive to raising of the operating member to encase the source in the shield, and stop members limiting the upward movement of the operating member, so that further upward movement of the handle lifts the device.

8. A radioactivity device including a housing and a source assembly within the housing comprising a radioactivity source and a radioactivity shield, a rigid operating member having a carrying handle on the end thereof and movable between lowered and raised positions of the carrying handle, and means interconnecting the operating member and the source assembly to expose the source at the bottom of the shield in the lowered position of the handle and to enclose the source within the shield in the raised position of the handle, so that the source may be removed from the shield for desired irradiation by lowering of the handle and is automatically restored to the shielded condition when the device is raised by the handle.

9. The device of claim 8, having a releasable latch securing the operating member in the raised position, so that accidental exposure of the source is avoided.

10. A radioactivity device comprising a radioactivity source and a radioactivity shield, a rigid operating member having a carrying handle on the end thereof and movable between lowered and raised positions of the carrying handle, means interconnecting the operating member and the source to expose the source at the bottom of the shield in the lowered position of the handle, and stop means limiting relative motion between the operating member and the shield to the path bounded by the raised and lowered positions, so that in the lowered position of the handle the source is in a standard downwardly exposed position and in the raised position of the handle the source is encased in the shield and further lifting of the handle lifts the entire device.

11. A radioactivity device having a source assembly comprising a radioactivity source and a radioactivity shield, the source and the shield being relatively movable between positions wherein the source is downwardly exposed and the source is encased in the shield, a carrying handle on the top of the device, means defining a path of motion of the carrying handle between raised and lowered positions, and mechanism responsive to raising of the handle to encase the source in the shield, so that lifting of the device automatically shields the source.

12. A radioactivity device comprising a radioactivity source and a radioactivity shield, a carrying handle on top of the device, means operable when the device is resting on a surface to expose the source only downwardly, and means responsive to lifting of the carrying handle to encase the source wholly within the shield.

13. A device for measurement of characteristics of materials comprising a radioactivity detector, a source assembly operatively associated with the detector comprising a radiation shield having a portion of reduced thickness and a portion of full thickness and a radiation source, an operating member movable between two positions, and mechanism interconnecting the operating member and the source assembly to move a part of said assembly in response to manipulation of the operating member between a first position wherein the source is uncovered in a direction displaced from the line between the source and the detector and the full thickness of the shield is between the source and the detector and a second position wherein the full thickness of the shield covers the source in said direction and the reduced thickness portion is in the line between the source and the detector, so that in one position of the operating member the detector response is primarily dependent only on emanations induced by the source from a material under measurement located in the mentioned direction while in the other position of the operating member the detector response is primarily dependent only on emanations from the source.

14. The device of claim 13 wherein the full thickness of the shield covers the source in the second position in all directions other than the line between the source and the detector.

15. A surface-type device for measurement of characteristics of materials comprising a housing, a detector at one end of the housing, a radioactivity source at the other end of the housing, a shield between the source and the detector having a partial bore therein in the direction of the detector, and mechanism coupled to the source for selectively moving the source between a position wherein the source is exposed outside the shield with the shield interposed between the source and the detector and a position wherein the source is encased within the shield in alignment with the partial bore.

16. A device for measurement of characteristics of materials comprising a radioactivity detector, a source assembly comprising a radiation shield having a portion of reduced thickness and a portion of full thickness and a radiation source, and mechanism for moving at least part of one of said members of the source assembly between a first position wherein the source is directly exposed to a material under measurement in a direction displaced from the line between the source and the detector and the full thickness portion of the shield member is between the source and the detector and a second position wherein the full thickness of the shield covers the source in said direction and the reduced thickness portion is in the line between the source and the detector, so that in one position the detector response is primarily dependent only on emanations from the material under measurement induced by the source while in the other position the detector response is primarily dependent only on emanations from the source.

17. A device for measurement of characteristics of materials comprising a radioactivity source and a radioactivity detector, and a housing retaining said elements in spaced relation, and spaced shield members between the source and detector adjacent to the source and detector, respectively, at least one of said shield members being in the direct line between the source and the detector and the shield member adjacent to the source being constructed and arranged to absorb radiations from the source at small angles to the direct line and the shield member adjacent to the detector being constructed and arranged to absorb radiations toward the detector at small angles to the direct line, whereby the effect of surface inhomogeneities upon the measurement is minimized.

18. The device of claim 17 wherein the housing has a wall enclosing, and closely adjacent to, the elements recited, the housing being recessed between the shields.

19. A radioactivity device for the measurement of density of soil comprising a gamma-ray source and a gamma-ray shield, a carrying handle on top of the device, means operable when the device is resting on a surface to expose the source only downwardly, means responsive to lifting of the carrying handle to encase the source wholly within the shield, a partial bore in the shield in alignment with the encased position of the source, a detector in alignment with the bore and spaced from the shield to accommodate protruding portions of a material under measurement, and an auxiliary shielding member adjacent to the detector and constructed and arranged to shield the detector from gamma-rays scattered at small angles from the exposed position of the source.

References Cited in the file of this patent

UNITED STATES PATENTS

| | | |
|---|---|---|
| 2,666,857 | McLaren et al. | Jan. 19, 1954 |
| 2,719,926 | Procter et al. | Oct. 4, 1955 |
| 2,772,361 | Hiestand | Nov. 27, 1956 |
| 2,781,453 | Belcher | Feb. 12, 1957 |
| 2,843,754 | Costello | July 15, 1958 |
| 2,843,755 | Staker et al. | July 15, 1958 |